(12) United States Patent
Suzuki et al.

(10) Patent No.: US 8,790,558 B2
(45) Date of Patent: Jul. 29, 2014

(54) METHOD FOR MANUFACTURING FILM FOR FILM CAPACITOR

(75) Inventors: Kazuhiro Suzuki, Saitama (JP); Kenro Takizawa, Saitama (JP); Masaru Yoneyama, Saitama (JP); Junya Ishida, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 734 days.

(21) Appl. No.: 12/969,173

(22) Filed: Dec. 15, 2010

(65) Prior Publication Data

US 2012/0091622 A1 Apr. 19, 2012

(30) Foreign Application Priority Data

Oct. 18, 2010 (JP) .................. 2010-233657

(51) Int. Cl.
*D01D 5/16* (2006.01)
(52) U.S. Cl.
USPC ........................................ 264/210.2
(58) Field of Classification Search
USPC ........................................ 264/210
See application file for complete search history.

(56) References Cited

U.S. PATENT DOCUMENTS

| | | | | |
|---|---|---|---|---|
| 3,950,480 A * | 4/1976 | Adams et al. | ........ | 264/284 |
| 4,731,390 A * | 3/1988 | Mizuno et al. | ........ | 521/134 |
| 6,335,479 B1 * | 1/2002 | Yamada et al. | ........ | 136/251 |
| 2004/0261836 A1 * | 12/2004 | Kataoka et al. | ........ | 136/244 |

FOREIGN PATENT DOCUMENTS

| | | |
|---|---|---|
| JP | 08-020060 A | 1/1996 |
| JP | 09-253880 | 9/1997 |
| JP | 2000-033647 | 2/2000 |
| JP | 2001-304264 | 10/2001 |
| JP | 2007-025667 | 2/2007 |
| JP | 2007-300126 A | 11/2007 |
| JP | 2007-308604 A | 11/2007 |
| JP | 2009-132874 | 6/2009 |
| JP | 2009-132874 A | 6/2009 |
| JP | 2009-248525 | 10/2009 |
| JP | 2010-147329 | 7/2010 |

OTHER PUBLICATIONS

Japanese Office Action and English Translation dated Nov. 12, 2013.
Japanese Office Action issued Apr. 22, 2014; Japanese Application No. 2010-233657.

* cited by examiner

*Primary Examiner* — Joseph S Del Sole
*Assistant Examiner* — John Robitaille
(74) *Attorney, Agent, or Firm* — Arent Fox LLP

(57) ABSTRACT

A film for film capacitors having a thickness of 10 microns or less, is manufactured by the successive steps of: mixing and preparing a forming material composed of a thermoplastic resin composition; melting and extruding the forming material to a film through a T-die; pinching and cooling the film between a pressure roll and a cooling roll having a rough surface for forming a rough surface to the film, wherein the rough surface of the cooling roll has (σ/Ra) of 0.2 or less, and the rough surface of the film has (σ/Ra) of 0.2 or less, where (Ra) is an arithmetic average roughness defined by a method specified in JIS B 0601 2001, and (σ) is a standard deviation; and rolling up the cooled film onto a winding tube in a winding unit.

17 Claims, 2 Drawing Sheets

METHOD FOR MANUFACTURING FILM FOR FILM CAPACITOR

BACKGROUND OF THE INVENTION

1. Field of the Invention

This invention relates to a film for film capacitors.

2. Description of the Related Art

Presently, a dielectric film for film capacitors is made of a resin selected from 4 types of resin compositions such as a polypropylene resin (PP resin), a polyethylene terephthalate resin (PET resin), a polyphenylsulfide resin (PPS resin) and a polyethylene naphthalate resin (PEN resin). A capacitor is constructed by vacuum depositing metal films onto both sides of the dielectric film.

However, a PP resin film is used at 105 degrees C. or less and a PET resin film is used at 125 degrees C. or less, because heat resistant properties of the PP resin and the PET resin are poor. On the other hand, a capacitor used for an inverter requires heat resistance of 150 degrees C. or more, due to the widespread use of hybrid cars. Accordingly, in order to apply the PP resin film or the PET resin film to the capacitor of hybrid cars, the following 2 countermeasures must be employed: installing a large cooling unit without any regard to weight reduction; installing a capacitor on a driver seat side, etc., which is far from the engine room, or a heat source. Consequently, weight reduction and cost reduction are the problems to be solved, with regard to the capacitor of hybrid cars.

Though a PPS resin has good heat resistance and a PPS resin film for film capacitors can be used at 160 degrees C. or less, it has limited range of use because of its low dielectric breakdown voltage and low voltage proof. Further, though PEN resin has also good heat resistance and a PEN resin film for film capacitors can be used at 160 degrees C. or less, it has limited range of use because of its high dielectric loss and its large temperature dependence of dielectric tangent.

On the other hand, a polyetherimide resin (PEI resin) film draws attention as a film for film capacitors as disclosed in Japanese Laid Open Patent Application Publication No. 2007-300126. A film composed of a PEI resin is suitable for a film for film capacitors because of its high heat resistance resulting from its high glass transition point of 200 degrees C. or more, its high dielectric breakdown voltage and high voltage proof, and its small frequency dependence and temperature dependence of dielectric tangent.

A thin film composed of a thermoplastic resin used as a film for film capacitors lacks in lubricity (or slidability) and so sometimes causes troubles such as interruption of winding operation or slitting operation of the film, appearance of wrinkles on the film, and sticking of the film to guide rolls, etc., during manufacturing operation of the film. Further, assembling of a capacitor from the film is sometimes interrupted by blocking of the film or breakage of the film during uncoiling the film. For this reason, slidability of the film should be improved, in order to use the thermoplastic resin film as a film for film capacitors.

Each of the PP resin, the PET resin, the PPS resin and the PEN resin is a thermoplastic crystalline resin. A film composed of any of the resins is manufactured by so called "a biaxially stretching method". In the biaxially stretching method, a melt resin is extruded through a T-die, the extrusion is cooled and solidified in a casting unit and it is stretched through a longitudinally stretching machine and a transversely stretching machine in turn, and then a biaxially stretched film is rolled up onto a winding tube. In a thin film manufactured through the biaxially stretching method, even if an emboss patterned surface of the cooling roll is transferred onto the film surface during cooling, the transferred embossed pattern on the film shall be finished to a mirror surface by the following stretching processes. For this reason, in order to increase the slidability of the film composed of any of these thermoplastic crystalline resins, a surface roughening method in which different phase particles or fillers are dispersed in the resin is employed, as disclosed in Japanese Laid Open Paten Application Publication No. 2007-308604 and Japanese Laid Open Paten Application Publication No. 2009-132874.

Japanese Laid Open Patent Application Publication No. 2007-308604 discloses that in order to provide a biaxially stretched polypropylene film easily slidable and excellent in device winding processability during capacitor assembling, it is effective to limit beta phase fraction in the film in a range of 5-25%, and to form a fine rough surface to the film so that the proportion of the area below the surface roughness curve higher than 0.1 micron beyond the average base line falls in a range of 15-30% of the total area below the surface roughness curve beyond the average base line.

Further, Japanese Laid Open Patent Application Publication No. 2009-32874 discloses a biaxially-oriented polyarylenesulfide film made of a thermoplastic resin composed of a polyarylenesulfide containing a PPS resin of 80 mole % or more, and other thermoplastic resin A, in which the thermoplastic resin A forms dispersion phase and the center line average roughness (Ra) of the film is in a range of 20-200 nm, and the maximum height Rmax of the film is 1000 nm or less. It is reported that the film is easily slidable, does not get wrinkled in film processing and shows no problem in slitting operation and capacitor assembling.

As mentioned, a crystalline thermoplastic resin film is manufactured by extruding a melt film through a T-die, cooling and solidifying the extruded melt film in a casting unit and then biaxially stretching the solidified film. The biaxially stretching process can not be applied to a PEI resin film manufacturing, because the PEI resin is one of amorphous thermoplastic resins and so shows poor ductility. For this reason, a final thickness of the PEI resin film is given at the cooling and solidifying process of a melt film extruded through a T-die, on a cooling roll. Japanese Laid Open Patent Application Publication No. 1996-20060 discloses that a PEI resin film having good transparency and easy slidability applicable to various usages is obtained by forming embossed surface of surface roughness in a range of 0.1-0.5 micron onto the film surface, by melt extruding a PEI resin on to a cast roll having embossed surface.

SUMMARY OF THE INVENTION

However, in a biaxially stretched thermoplastic resin film in which different phase materials are dispersed in the resin as disclosed in Japanese Laid Open Patent Application Publication No. 2007-308604, or fillers are dispersed in the resin as disclosed in Japanese Laid Open Patent Application Publication No. 2009-132874, in order to improve slidability of the film, the different phase material or the filler forms defects and causes deterioration of voltage proof of the film.

Further, Japanese Laid Open Patent Application Publication No. 1996-20060 discloses that a PEI film having good transparency and easy slidability applicable to various usages is obtained by forming an embossed surface of surface roughness in a range of 0.1-0.5 micron onto the film surface. The "surface roughness" seems to withstand "arithmetic average (Ra)" specified in JIS B 0601-2001, and "maximum height (Rz)" is not referred to in it. Therefore, even if "arithmetic average surface roughness (Ra)" is similar in a plurality of films, a film having too high "maximum height (Rz)" values shows the poor voltage proofs, because the points of high (Rz) values make defects.

The present inventors have carried out an extensive investigation for solving the above-mentioned drawbacks of the related arts. It is an object of the present invention to provide a method for manufacturing a film for film capacitors having high heat resistance, easy slidability which enhances productivity of the film and the capacitors, and high voltage proof.

In accordance with one aspect of the present invention, a method for manufacturing a film for film capacitors having a thickness of 10 microns or less is provided, including the successive steps of: mixing and preparing a forming material composed of a thermoplastic resin composition; melting and extruding the forming material to a film through a T-die; pinching and cooling the film between a pressure roll and a cooling roll having a rough surface for forming a rough surface to the film, wherein the rough surface of the cooling roll has (σ/Ra) of 0.2 or less, and the rough surface of the film has (σ/Ra) of 0.2 or less, where (Ra) is an arithmetic average roughness defined by a method specified in JIS B 0601 2001, and (a) is a standard deviation; and rolling up the cooled film onto a winding tube in a winding unit.

In accordance with one aspect of the present invention, the cooling roll has the rough surface of (Ra) in a range of 0.5-2.0 microns.

In accordance with one aspect of the present invention, the film has surface properties of (Ra) of 0.2 microns or less, (Rz/Ra) of 10 or less and a dynamic friction coefficient of 1.5 or less, where (Rz) is a maximum height defined by the method specified in JIS B 0601 2001.

In accordance with one aspect of the present invention, the rough surface of the cooling roll is formed by uniformly disposing in lines a plurality of a uniform size boss portions or dent portions having a circular cross-section, the circular cross-section having a diameter in a range of 5-50 microns, the boss portions each or dent portions each having a chamfer in a range of 0-25 microns and a height or a depth of 1-25 microns, a uniform pitch between adjacent bosses or adjacent dents being in a range of 10-100 microns.

In accordance with one aspect of the present invention, the rough surface of the cooling roll is formed by uniformly disposing in lines a plurality of a uniform size boss portions or dent portions having a polygonal cross-section, the polygonal cross-section having a circumscribed circle diameter in a range of 5-50 microns, the boss portions each or dent portions each having a chamfer in a range of 0-25 microns and a height or a depth of 1-25 microns, a uniform pitch between adjacent bosses or adjacent dents being in a range of 10-100 microns.

In accordance with one aspect of the present invention, a direction of each of the lines of the boss portions or dent portions being disposed on the rough surface of the cooling roll makes an angle in a range of 0-45 degrees to an axis direction of the cooling roll.

In accordance with one aspect of the present invention, the rough surface of the cooling roll forms a zigzag alignment, the direction of each of the lines of the boss portions or dent portions being disposed on the rough surface of the cooling roll making an angle of 45 degrees to the axis direction of the cooling roll.

In accordance with one aspect of the present invention, the rough surface of the cooling roll is formed by at least one method selected from a group including an etching method, a machining method, a electro-discharge machining method, carving method and a thermal spraying method.

In accordance with one aspect of the present invention, the rough surface of the cooling roll is formed by the etching method.

In accordance with one aspect of the present invention, a surface of the pressure roll is composed of a silicone rubber or a fluorine-containing rubber.

In accordance with one aspect of the present invention, the thermoplastic resin composition is composed of at least one resin selected from a group of crystalline thermoplastic resins including a polyethylene resin (PE resin), a polypropylene resin (PP resin), a polyamide resin (PA resin), a polyacetal resin (POM resin), a polyethylene terephthalate resin (PET resin), an ultra high molecularweight polyethylene resin (UHPE resin), a polybutylene terephthalate resin (PBT resin), a polymethylpentene resin (TPX resin), a polyphenylene sulfide resin (PPS resin), a polyetheretherketone resin (PEEK resin), a liquid crystal polymer resin (LCP resin), a polytetrafluoroethylene resin (PTFE resin) and a syndiotacticpolystyrene resin (SPS resin).

In accordance with one aspect of the present invention, the thermoplastic resin composition is composed of at least one resin selected from a group of amorphous thermoplastic resins including a polystyrene resin (PS resin), an acrylonitrile/styrene resin (AS resin), an acrylonitrile/butadiene/styrene resin (ABS resin), a methacryl resin (PMMA resin), a polyvinyl chloride resin (PVC resin), a polycarbonate resin (PC resin), a cycloolefin polymer resin (COP resin), a polyetherimide resin (PEI resin), a polyarylate resin (PAR resin), a polysulfone resin (PSF resin), a polyethersulfone resin (PES resin) and a polyamide-imide resin (PAI resin).

In accordance with one aspect of the present invention, the thermoplastic resin composition is composed of a polyetherimide resin (PEI resin)-based resin composition.

In accordance with one aspect of the present invention, the polyetherimide resin (PEI resin)-based resin composition comprises a polyetherimide resin (PEI resin) only resin composition or a resin composition composed of 100 parts by weight of the polyetherimide resin and 1.0-30.0 parts by weight of a fluorine-containing resin.

In accordance with one aspect of the present invention, the thermoplastic resin composition is composed of a polyetherimide resin (PEI resin)-based resin composition.

In accordance with one aspect of the present invention, the polyetherimide resin (PEI resin)-based resin composition comprises a polyetherimide resin (PEI resin) being alloyed or blended with at least one resin selected from a group including a block copolymer, a random copolymer, and a modified copolymer of the polyetherimide resin (PEI resin), being copolymerized with other possible monomer.

In accordance with one aspect of the present invention, the polyetherimide resin (PEI resin) further includes at least one resin selected from a group including a thermoplastic polyimide series resin such as a polyimide resin (PI resin) or a polyimide-imide resin (PAI resin), a polyarylene keton series resin such as a polyetherether keton resin (PEEK resin), or a polyether keton resin (PK resin), an aromatic polyethersulfone series resin such as a polysulfone resin (PSU resin), a polyethersulfone resin (PES resin), or a polyphenilsulfone resin (PPSU resin), a polyarylenesulfide series resin such as a polyphenylsulfide resin (PPS resin), a polyphenylsulfide sulfone resin, a polyphenylsulfide ketone resin, and a liquid crystal polymer resin (LCP resin).

In accordance with one aspect of the present invention, the fluorine-containing resin comprises at least one resin selected from a group including a group including a polytetrafluoroethylene resin (PTFE resin), a tetrafluoroethylene-perfluoroalkylvinylether copolymer resin (PFA resin), a tetrafluoroethylene-hexafuluoropropyl copolymer resin (FEP resin), a tetrafluoroethylene-ethylene copolymer resin (ETFE resin), a polyvinylidenefluoride resin (PVDF resin and a polychlorotrifuluoroethylene resin (PCTFE resin).

In accordance with one aspect of the present invention, moisture content of the forming material composed of the thermoplastic resin composition is 5,000 ppm or less before melting and extruding.

DESCRIPTION OF THE PREFERRED EMBODIMENTS

Figure 1:
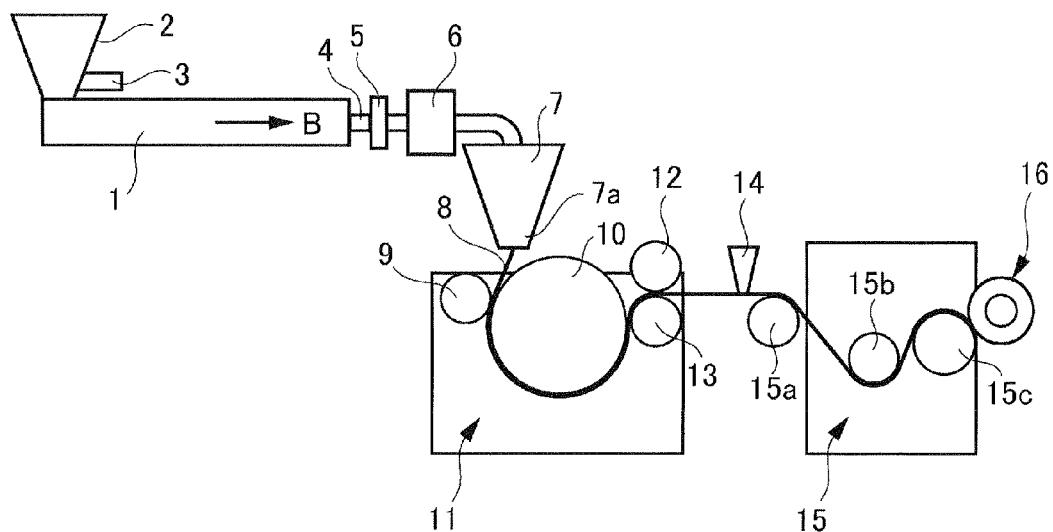
FIG. 1 is a schematic view of a manufacturing equipment of a film for film capacitors in accordance with an embodiment of the present invention.

Hereunder, a detailed description is given on a preferred embodiment according to the present invention, referring to the drawings.

The inventors have carried out a number of studies in order to attain the object of the present invention, and reached the present invention that a film for film capacitors having excellent properties of heat resistance, slidability and voltage proof can be manufactured by transferring a uniformly aligned pattern of a plurality of minute bosses or dents of a predetermined size each formed on the surface of the cooling roll, to a thermoplastic resin composition film extruded through a T-die.

The film for film capacitors of the present invention is manufactured by a melt extrusion method using a T-die. Firstly, a forming material is prepared by mixing a thermoplastic resin composition using a biaxial extruder as a mixer. The prepared forming material is melt extruded to form a film through a lip portion at a front end of a T-die disposed at a top part of a uniaxial extruder, and then the melt extruded film is cooled by pinching it between a pressure roll and a cooling roll having rough surface in a pulling unit, and then rolled up onto a winding tube in a winding unit.

At first, a description is given on the manufacturing method of a film for film capacitors according to an embodiment of the present invention, referring to FIG. 1.

As shown in FIG. 1, the manufacturing equipment of a film for film capacitors according to an embodiment of the present invention is provided with a hopper 2 for feeding a forming material, an extruder 1, a T-die 7, a cooling roll 10, a pressure roll 9, a pulling unit 11 and a winding unit 15.

In the extruder 1, the thermoplastic resin composition forming material is transferred in the direction of an arrow B with being mixed and stirred by an extruding screw (not shown in FIG. 1), while the forming material is heated and melted by an electrothermal means installed in the extruder 1. The thermoplastic resin composition forming material melted and transferred is fed to a filter means through the connecting tube 4. Then, an unmelted portion of the forming material is separated by the filter 5 and the remaining melted portion of the forming material is fed to a gear pump 6. The gear pump 6 extrudes the forming material to a T-die 7 applying increasing pressure to the forming material. A film having a predetermined thickness and a predetermined width is extruded through the lip portion of the T-die at a predetermined pressure. The film formed in this way is pulled onto the outer surface of a cooling roll having rough surface by pinching it between a pressure roll and the cooling roll. On the cooling roll, the rough surface of the cooling roll is transferred to the film surface, while the thickness is adjusted to a predetermined value, and the melted film is cooled and solidified. The film for film capacitors is finished by carrying the film between a pair of carrying rolls 12, 13 and rolling it up onto a winding tube 16 in the winding unit 15.

The thickness of a film for film capacitors is in a range of 0.5-10.0 microns, preferably in a range of 1.0-7.0 microns, more preferably in a range of 1.5-5.0 microns. If the thickness is less than 5 microns, tensile strength of the film deteriorates considerably, and it grows difficult to manufacture a film for film capacitors. If the thickness exceeds 10 microns, a capacitance per unit volume grows smaller.

A film composed of a thermoplastic resin lacks in lubricity (or slidability) and so sometimes causes troubles such as interruption of winding operation or slitting operation of the film, appearance of wrinkles on the film, and sticking of the film to guide rolls, etc., during manufacturing operation of the film. Further, assembling of a capacitor from the film is sometimes interrupted by blocking or breakage of the film during uncoiling the film. For this reason, slidability of the film should be improved, in order to use the thermoplastic resin film as a film for film capacitors.

According to an embodiment of the present invention, a pattern of uniformly distributed minute bosses or dents having a predetermined size each is formed on a metal cooling roll. In order to improve slidability of the film, a rough surface on the film for film capacitors is formed by pressing the film extruded through a T-die toward the cooling roll by a pressure roll and transferring the pattern of the minute bosses or dents on the cooling roll surface to the film surface.

Slidability of the film is directly correlated to its dynamic friction coefficient.

A predetermined pattern of uniformly distributed minute bosses or dents can be formed on the cooling roll surface, by a method such as a method of etching the cooling roll surface being masked in a predetermined pattern using an acid, a machining method, a electro-discharge machining method, a carving method, or a thermal spraying method, etc. Either of a polygonal or a circular cross-sectional shape is applicable to the bosses or dents on the cooling roll surface. In order to form a number of minute bosses or dents uniformly and efficiently onto the cooling roll surface, the etching method is preferable. If a sand blasting method is applied, a resultant pattern of bosses or dents is formed in larger dispersion of the shape and the size, and in inhomogeneous distribution, on the cooling roll surface.

Concerning the size of the bosses or the dents, a circumscribing circle diameter of the polygons or a diameter of the circles is preferably in a range of 5-50 microns. If it is less than 5 microns, it is difficult to form bosses or dents uniformly. If it exceeds 50 microns, the dielectric breakdown voltage of the film having the transferred surface pattern will possibly be deteriorated considerably. Corresponding to the diameter, the edge is preferably in a range of 0-25 microns, the height of the bosses or depth of the dents is preferably in a range of 1-25 microns, the pitch of the uniform distribution of the bosses or the dents is preferably in a range of 10-100 microns. The height of the bosses or the depth of the dents on the cooling roll surface does not need to exceed 25 microns, because the depth of the dents or the height of the bosses of the film transferred from the bosses or the dents on the cooling roll is much smaller than those on the cooling roll. The pitch exceeding 100 microns causes some trouble in assembling a capacitor using the film having the pattern transferred.

The etching can be practiced using any known method which includes evaporating a noncorrosive layer of $Si_3N_4$, Au or $SiO_2$ as a masking material, and etching the unmasked portion by a $HF+HNO_3$ based acid as an etchant.

A corner, or an edge, is etched preferably in etching, and so transverse cross-sectional shape of each of the bosses or the dents grows circular after etching, even if the masking is made in a polygonal shape each, and each corner of the bosses or the dents is chamfered in an arc shape. Further, a dent is formed in a hemispherical shape by etching. The depth of the etching is set by a predetermined etching time corresponding to an etchant. There is generated a case that the height of the bosses or the depth of the dents grows smaller than the predetermined etching depth, because the portion just below each of the masks is etches away. For this reason, the above mentioned circumscribing circle diameter of the polygons or the diameter of the circles is defined as a diameter of each masks before etching.

The surface of the pressure roll can be made of a rubber selected from a group of a natural rubber, an isoprene rubber, a butadiene rubber, a norbornene rubber, an acrylonitrilebutadiene rubber, a nitrile rubber, an urethane rubber, a silicone rubber, a fluorine-containing rubber, etc. Among them, the silicone rubber or the fluorine-containing rubber is preferable because of their high heat resistance. An inorganic compound such as silica or alumina can be added to the surface rubber of the pressure roll.

The moisture content of the thermoplastic resin composition forming material is adjusted to 5,000 ppm or less, preferably 2,000 ppm or less, before melt extruding. If the moisture content exceeds 5,000 ppm, the film for film capacitors will possibly foam. The adjustment of the moisture content can be made using a hot-air dryer.

A film for film capacitors can be made from a crystalline thermoplastic resin composition composed of at least one resin selected from a group including a polyethylene resin (PE resin), a polypropylene resin (PP resin), a polyamide resin (PA resin), a polyacetal resin (POM resin), a polyethylene terephthalate resin (PET resin), an ultra high molecular-weight polyethylene resin (UHPE resin), a polybutylene terephthalate resin (PBT resin), a polymethylpentene resin (TPX resin), a polyphenylene sulfide resin (PPS resin), a polyetheretherketone resin (PEEK resin), a liquid crystal polymer resin (LCP resin), a polytetrafluoroethylene resin (PTFE resin) and a syndiotacticpolystyrene resin (SPS resin). The crystalline thermoplastic resin film is typically finished to a predetermined final thickness by biaxially stretching a film melt extruded through a T-die, while it can also be finished by applying the method of the present invention. That is, the crystalline thermoplastic resin composition is extruded to a predetermined final thickness through a T-die, and then a rough surface is formed on the film by transferring the rough surface pattern of the cooling roll to the film surface through pinching the film between the pressure roll and the cooling roll, without applying the biaxially stretching process.

A film for film capacitors can be made from a amorphous thermoplastic resin composition composed of at least one resin selected from a group including a polystyrene resin (PS resin), an acrylonitrile/styrene resin (AS resin), an acrylonitrile/butadiene/styrene resin (ABS resin), a methacryl resin (PMMA resin), a polyvinyl chloride resin (PVC resin), a polycarbonate resin (PC resin), a cycloolefin polymer resin (COP resin), a polyetherimide resin (PEI resin), a polyarylate resin (PAR resin), a polysulfone resin (PSF resin), a polyethersulfone resin (PES resin) and a polyamide-imide resin (PAI resin). The biaxially stretching process can not be applied to the manufacturing of the amorphous thermoplastic resin film, due to its poor ductility. However, the amorphous thermoplastic resin composition can be melt extruded to a predetermined final thickness through a T-die, and then a rough surface can formed on the film by transferring the rough surface pattern of the cooling roll to the film surface through pinching the film between the pressure roll and the cooling roll.

A polyetherimide resin composition having a glass transition point higher than 200 degrees C., proper properties and dimensional stability is preferable as a thermoplastic resin composition for the present invention.

The polyetherimide resin composition employed in the present invention is not limited specifically. For example, a PEI resin having a repeating unit represented by the chemical formula

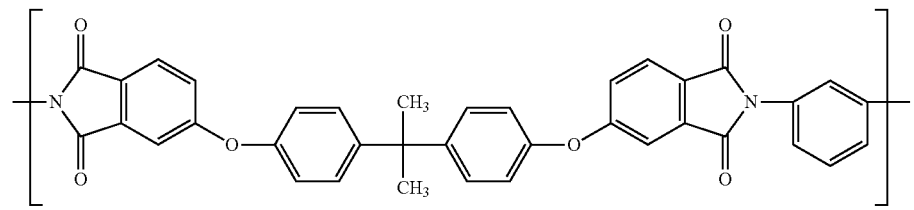

or the chemical formula

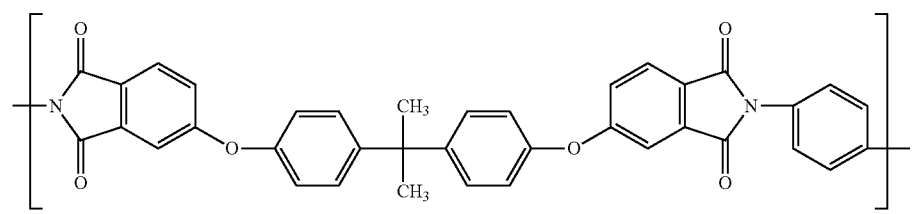

can be used for it.

A manufacturing method of a PEI resin is disclosed, for example in Japanese Examined Patent Application Publication No. 57-9372 and Japanese Laid Open Patent Application Publication No. 59-500867. Specific examples of the PEI resins include a resin of a trade name "Ultem 1000-1000" having Tg (glass transition point) of 211 degrees C. manufactured by SABIC Innovative Plastics, a resin of a trade name "Ultem 1010-1000" having Tg of 223 degrees C. manufactured by SABIC Innovative Plastics, a resin of a trade name "Ultem CRS5001-1000" having Tg of 235 degrees C. manufactured by SABIC Innovative Plastics.

A block copolymer, a random copolymer or a modified copolymer of a PEI resin which is copolymerized with another possible monomer is applicable as the PEI resin composition, as far as the efficacy of the present invention is not undermined. For example, a resin of a trade name "Ultem CRS5001-1000", a polyetherimide sulfone copolymer, having Tg of 252 degrees C. manufactured by SABIC Innovative Plastics can be used. Further, either a single PEI resin, or a PEI resin manufactured by alloying or blending more than 2 kinds of PEI resins is applicable.

The PEI resin can include at least one resin selected from a group including a thermoplastic polyimide series resin such as a polyimide (PI) resin or a polyamide-imide (PAI) resin, a polyarylene keton series resin such as a plyether ether keton (PEEK) resin, or a polyether keton (PK) resin, an aromatic polyethersulfone series resin such as a polysulfone (PSU) resin, a polyethersulfone (PES) resin, or a polyphenilsulfone (PPSU) resin, a polyarylenesulfide series resin such as a polyphenylsulfide (PPS) resin, a polyphenylsulfide sulfone resin, a polyphenylsulfide ketone resin, and a liquid crystal polymer resin (LCP resin), as far as the efficacy of the present invention is not undermined. There exist three types of LCPs. Type I is a polycondensation of a polyethylene terephthalate (PET) with a para-hydroxybenzoic acid. Type II is a polycondensation of a phenol and a phthalic acid with a para-hydroxybenzoic acid. Type III is a polycondensation of a 2-hydroxy-6-naphthoic acid with a para-hydroxybenzoic acid. Any type of LCP among the type I, II and III is applicable.

According to an embodiment of the present invention, a resin composition in which a PEI resin is mixed with a fluorine-containing resin having a specified melt viscosity is used, besides a PEI resin, as a PEI resin-based resin composition. The fluorine-containing resin is a compound having fluorine atoms in the polymer main chain, and has melt viscosity of 120,000 poises or less, the melt viscosity is measured with a flow tester using a die of 1.0 mm in diameter and 10 mm in length, under loading condition of 490 N at 360 degrees C. If the melt viscosity of a fluorine-containing resin exceeds 120,000 poises, the fluidity of the fluorine-containing resin deteriorates considerably. As a result, fine bosses of the fluorine-containing resin appear on the surface of the film for film capacitors, and the dielectric voltage deteriorates and a problem is caused in the voltage proof. Further, the fluorine-containing resin of high melt viscosity and low fluidity turns into a gel. Because the gel portions tend to open small holes in the film for film capacitors, and to cause inhomogeneous dispersion of the fluorine-containing resin in it, mechanical properties of the film for film capacitors degrade, and the film tends to break during manufacturing, and so it grows difficult to manufacture thin films for film capacitors, from a resin composition of a PEI resin mixed with a fluorine-containing resin having a melt viscosity exceeding 120,000 poises.

The fluorine-containing resin is preferably in solid state at a temperature below the melting point, generally. For example, at least one selected from a group including polytetrafluoroethylene (a polytetrafluoroethylene resin, having melting point in a range 325-330 degrees C. and a continuous endurance temperature of 260 degrees C., hereunder called "PTFE resin"), tetrafluoroethylene-perfluoroalkylvinylether copolymer (a tetrafluoroethylene-perfluoroalokoxyethylene copolymer resin, having melting point in a range 300-315 degrees C. and a continuous endurance temperature of 260 degrees C., hereunder called "PFA resin"), tetrafluoroethylene-hexafluoropropyl copolymer (a tetrafluoroethylene-hexafluoropropyl copolymer resin, having melting point of 270 degrees C. and a continuous endurance temperature of 200 degrees C., hereunder called "FEP resin"), tetrafluoroethylene-ethylene copolymer (a tetrafluoroethylene-ethylene copolymer resin, having melting point in a range 260-270 degrees C. and a continuous endurance temperature of 150 degrees C., hereunder called "ETFE resin"), polyvinylidenefluoride (a polyvinylidenefluoride resin, having melting point in a range 170-175 degrees C. and a continuous endurance temperature of 150 degrees C., hereunder called "PVDF resin"), and polychlorotrifluoroethylene (a polychlorotrifluoroethylene resin, having melting point in a range 210-215 degrees C. and a continuous endurance temperature of 120 degrees C., hereunder called "PCTFE resin") can be referred. Among the above mentioned fluorine-containing resins, the PFA resin or the FEP resin is preferable, because of the excellent heat resistance due to the continuous endurance temperature of 200 degrees C. or more, and the standpoints of cost and easy handling, in each of the resins. They can be used alone each, or in a copolymer blend.

In order to give slidability to a film made of a thermoplastic resin, or a film made of a thermosetting resin, it is generally effective to add a PTFE resin to each of them. However, irrespective of the excellent heat resistance due to the high continuous endurance temperature of 260 degrees C., the PTFE resin hardly shows melt flow due to its high melt viscosity. In a film for film capacitors manufactured through melt extruding a thermoplastic resin composition with addition of a PTFE resin, a kind of thermoplastic resins, the PTFE resin exists in fine particles, and fine bosses are formed on the surface of the film for film capacitors, as is the case for a thermoplastic resin composition with addition of an inorganic compound. This causes deterioration of the dielectric breakdown voltage and problem in the voltage proof. As mentioned above, the PTFE resin also turns into a gel in the thermoplastic resin composition with addition of a PTFE resin, due to its high melt viscosity. Because the gel portions tend to open small holes in the film for film capacitors, and to cause inhomogeneous dispersion of the PTFE resin in it, mechanical properties of the film for film capacitors degrade, and the film tends to break during manufacturing, and so it grows difficult to manufacture thin films for film capacitors, from the thermoplastic resin composition with addition of a PTFE resin.

In addition to the PEI resin and the (PEI+PFA) resin, a polycarbonate resin (PC resin) and a crystalline polymethylpentene resin (TPX resin) are used as materials for EXAMPLEs, according to an embodiment of the present invention.

EXAMPLES

Figure 2:
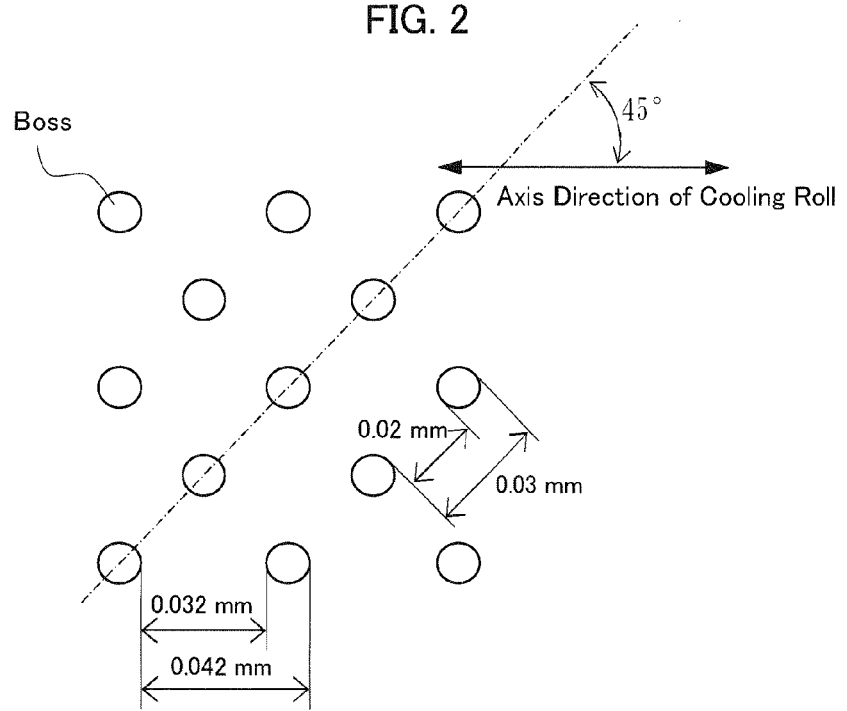
FIG. 2 is a diagram illustrating a zigzag aligned pattern of pillar shape minute bosses on the etching roll surface in accordance with an embodiment of the present invention.
Figure 3:
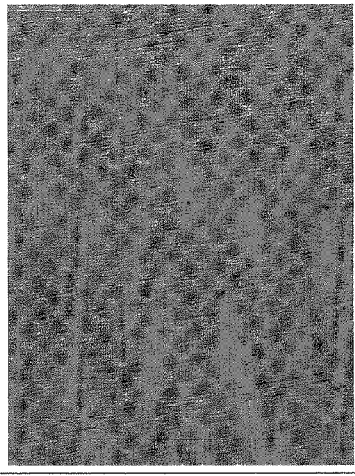
FIG. 3 is CCD photographs, each of which shows a transfer state of a surface pattern of a cooling roll to surface of a film for film capacitors, in accordance with an embodiment of the present invention.

Hereunder, examples (EXAMPLEs) 1-8 and references (REFs) 1-4 on the method for manufacturing a film for film capacitors are described in detail referring to Table 1, Table 2, FIG. 1, FIG. 2 and FIG. 3, according to an embodiment of the present invention. The EXAMPLEs are merely illustrative, and should not be construed to be any sort of limitation on the scope of the claimed invention.

Table 1 compares surface specifications and actual surface properties of the cooling roll.

TABLE 1

| Cooling Roll | | Surface Roughness (μm) | | | Arithmetic Average Roughness Ra (μm) on 10 points/10 cm × 10 cm | | |
|---|---|---|---|---|---|---|---|
| Naming | Specification | Ra (Arithmetic Average Roughness) | Rz (Maximum Height) | Rz94 (10 points Average Roughness) | Avg | σ | σ/Avg |
| Mirror Roll | Polishing | 0.04 | 0.36 | 0.25 | 0.043 | 0.005 | 0.119 |
| Blast Roll Ra = 1 μm | Sand Blasting | 1.06 | 9.62 | 7.21 | 1.064 | 0.205 | 0.193 |
| Blast Roll Ra = 3 μm | Sand Blasting | 2.90 | 17.28 | 11.93 | 2.900 | 0.595 | 0.205 |
| Etching Roll Boss 5 μm | Zigzag Aligned Pattern of Bosses Height: 0.005 mm Pitch: 0.025 mm Dia: 0.01 mm | 1.28 | 4.75 | 4.64 | 1.284 | 0.150 | 0.117 |
| Etching Roll Boss 10 μm | Zigzag Aligned Pattern of Bosses Height: 0.01 mm Pitch: 0.03 mm Dia: 0.01 mm | 1.86 | 8.15 | 7.71 | 1.855 | 0.231 | 0.125 |
| Etching Roll Dent 10 μm | Zigzag Aligned Pattern of Dents Depth: 0.01 mm Pitch: 0.03 mm Dia: 0.02 mm | 0.89 | 7.41 | 7.24 | 0.894 | 0.083 | 0.093 |

The naming "Etching Roll Boss 5 μm" having the specification of "Zigzag aligned Pattern of Bosses, Height: 0.005 mm, Pitch: 0.025 mm, Dia: 0.01 mm" was used as a cooling roll for EXAMPLEs 1 and 2. Here, the zigzag alignment means an alignment where the direction of each of the lines of the bosses are disposed on the rough surface of the cooling roll making an angle of 45 degrees to the axis direction of the cooling roll, as shown in FIG. 2. Viewing the bosses or the dents in a vertical direction to the cooling roll axis, or a longitudinal direction of the film, distances of adjacent bosses or dents are uniform in both the zero degrees alignment and the zigzag alignment. However, the distance in the zigzag alignment is shorter than the distance in the zero degrees alignment, and so the film having a pattern of bosses or dents transferred from the zigzag aligned bosses or dents of the cooling roll surface is preferable for assembling capacitors. The naming "Etching Roll Boss 10 μm" having the specification of "Zigzag Aligned Pattern of Bosses, Height: 0.01 mm, Pitch: 0.03 mm, Dia: 0.01 mm" was used as a cooling roll for EXAMPLEs 3-7. The naming "Etching Roll Dent 10 μm" having the specification of "Zigzag Aligned Pattern of Bosses, Depth: 0.01 mm, Pitch: 0.03 mm, Dia: 0.02 mm" was used as a cooling roll for EXAMPLE 8. The naming "Mirror Roll" having the specification of "Polishing" was used as a cooling roll for REF 1. The naming "Blast Roll Ra=1 μm" having the specification of "Sand Blasting" was used as a cooling roll for REFs 2-4. The naming "Blast Roll Ra=3 μm" having the specification of "Sand Blasting" was used as a cooling roll for REF 5.

In TABLE 1, a coefficient of variation "CV" of average value of 10 arithmetic average roughness (Ra) values measured over 10 cm×10 cm surface area of the cooling roll, or (standard deviation σ)/(Ra average) is shown. Both "Blast Roll Ra=1 μm" and "Blast Roll Ra=3 μm" show a large CV value of about 0.2. On the other hand, the 3 "Etching Rolls" show smaller CV values in a range of 0.093-0.125, which is comparable to the CV value of 0.119 for "Mirror Roll". This means that the "Blast Rolls" has a rough surface with a large dispersion of dimensions, which can not be represented in (Ra) values.

TABLE 2 shows an arithmetic average roughness (Ra), a dynamic friction coefficient, an average value of thickness and a dielectric breakdown voltage of a film for capacitor films for EXAMPLEs 1-8 and REFs 1-4 each manufactured from a material shown using a cooling roll of TABLE 1. Further, a Ra average, average of 10 arithmetic average roughness (Ra) values measured over 10 cm×10 cm surface area of a film, a standard deviation (σ) of the Ra average and the CV of the Ra average, (σ/Ra average) are also shown in TABLE 2.

TABLE 2

| | | Cooling roll | | Film | | | | | | | | | | |
|---|---|---|---|---|---|---|---|---|---|---|---|---|---|---|
| | | | | Surface Roughness (μm) | | | | Arithmetic Average Roughness Ra(μm) on 10 points/10 cm × 10 cm | | | Dynamic Friction Coeffi- | Thick- ness | Dielectric Breakdown Voltage (V/μm) | | | |
| No. | Mate- rial | Naming | Temp (° C.) | Ra | Rz | Rz94 | Rz/ Ra | Avg | σ | σ/ Avg | cient | (μm) Avg | Avg | Max | Min | σ |
| REF 1 | PEI | Mirror Roll | 180 | 0.05 | 0.36 | 0.33 | 6.8 | 0.054 | 0.007 | 0.130 | 1.70 | 4.91 | 309 | 398 | 213 | 32.5 |
| REF 2 | PEI + PFA | Blast Roll Ra = 1 μm | 180 | 0.20 | 2.08 | 1.05 | 10.2 | 0.196 | 0.045 | 0.229 | 0.71 | 4.93 | 290 | 357 | 104 | 38.7 |
| REF 3 | PEI | | 180 | 0.18 | 1.98 | 0.95 | 10.8 | 0.178 | 0.044 | 0.247 | 1.21 | 5.08 | 307 | 371 | 118 | 45.5 |
| REF 4 | PC | | 130 | 0.20 | 2.11 | 1.10 | 10.6 | 0.204 | 0.051 | 0.250 | 1.33 | 4.96 | 207 | 258 | 95 | 43.2 |
| REF 5 | PEI | Blast Roll Ra = 3 μm | 180 | 0.32 | 3.15 | 1.11 | 9.8 | 0.322 | 0.092 | 0.286 | 0.87 | 4.95 | 247 | 375 | 86 | 54.2 |
| EXAMPLE 1 | PEI + PFA | Etching Roll Boss 5 μm | 210 | 0.06 | 0.44 | 0.32 | 7.3 | 0.055 | 0.005 | 0.091 | 0.64 | 5.03 | 292 | 401 | 211 | 35.2 |
| EXAMPLE 2 | PEI | | 210 | 0.06 | 0.50 | 0.39 | 8.3 | 0.062 | 0.007 | 0.113 | 0.81 | 5.10 | 331 | 452 | 215 | 32.6 |

TABLE 2-continued

| | | Cooling roll | | Film | | | | | | | | | | | |
|---|---|---|---|---|---|---|---|---|---|---|---|---|---|---|---|
| | | | | Surface Roughness (μm) | | | | Arithmetic Average Roughness Ra(μm) on 10 points/10 cm × 10 cm | | | Dynamic Friction Coefficient | Thickness (μm) | Dielectric Breakdown Voltage (V/μm) | | | |
| No. | Material | Naming | Temp (°C.) | Ra | Rz | Rz94 | Rz/Ra | Avg | σ | σ/Avg | | Avg | Avg | Max | Min | σ |
| EXAMPLE 3 | PEI + PFA | Etching Roll Boss 10 μm | 210 | 0.13 | 0.73 | 0.55 | 5.6 | 0.126 | 0.013 | 0.107 | 0.52 | 5.03 | 352 | 445 | 206 | 38.1 |
| EXAMPLE 4 | PEI | | 180 | 0.07 | 0.47 | 0.31 | 7.2 | 0.071 | 0.004 | 0.056 | 0.72 | 4.86 | 346 | 447 | 222 | 30.9 |
| EXAMPLE 5 | | | 210 | 0.12 | 0.81 | 0.69 | 6.8 | 0.121 | 0.012 | 0.100 | 0.63 | 4.87 | 337 | 449 | 226 | 36.2 |
| EXAMPLE 6 | PC | | 130 | 0.11 | 0.68 | 0.49 | 6.2 | 0.112 | 0.012 | 0.107 | 0.92 | 4.99 | 224 | 281 | 137 | 30.5 |
| EXAMPLE 7 | TPX | | 60 | 0.10 | 0.65 | 0.48 | 6.5 | 0.104 | 0.013 | 0.125 | 0.48 | 5.11 | 597 | 812 | 402 | 36.2 |
| EXAMPLE 8 | PEI | Etching Roll Dent 10 μm | 210 | 0.04 | 0.38 | 0.30 | 9.5 | 0.044 | 0.005 | 0.114 | 0.74 | 4.99 | 336 | 423 | 208 | 38.3 |

As shown in TABLE 2, as a material for EXAMPLES 1-8 and REFs (References) 1-5 each, (a) a polyetherimide resin (PEI resin) or a PEI resin+tetrafluoroethylene-perfluoroalkylvinylether copolymer resin (PFA resin), (b) a polycarbonate resin (PC resin), or (c) a polymethylpentene resin (TPX resin) was used. Hereinafter, manufacturing conditions of a film for film capacitors from each of the above resins are described.

(a) A Film Composed of a PEI Resin or a (PEI Resin+PFA Resin)

As a resin composition, a PEI resin or a (PEI resin+PFA resin), a PEI resin-based resin composition having improved slidability, which was prepared by adding 5 weight parts of a PFA resin as a fluorine-containing resin to 100 weight parts of a PEI resin was used. Either of the resin compositions was mixed at a cylinder temperature of 320-350 degrees C., an adaptor temperature of 360 degrees C. and a die temperature of 360 degrees C. using a twin-screw extruder of a trade name "PCM30 L/D=35" supplied by IKEGAI, and then a forming material was prepared in a shape of pellets.

As a PEI resin, a resin of a trade name "ULTEM1010" having Tg of 217 degrees C., an amorphous resin, manufactured by INNOVATIVE PLASTICS, Inc., was used. As a PFA resin, a resin of a trade name "Fluon PFA P-62XP" manufactured by ASAHI GLASS COMPANY, was used.

A forming material prepared in shape of pellets was dried by keeping it in a hot-air drier having an exhaust outlet heated to 160 degrees C. After checking that the moisture content in the resin composition of the forming material was 300 ppm or less, a film with the surface roughness shown in TABLE 2 was processed using a manufacturing equipment of a film for film capacitors of FIG. 1 which was constructed of a 40 mm-dia single screw extruder of a trade name "MVS 40-25 L/D=25" manufactured by IKG Corporation, as the extruder 1, the T-die 7 and the cooling roll 10, at a cylinder temperature of 330-350 degrees C., a screw rotation number of 30 rpm, an adaptor temperature of 360 degrees C. and a T-die temperature of 360 degrees C. The melt extrusion of the forming material was cast onto the cooling roll being kept at a temperature shown in TABLE 2, and then the rough surface of the cooling roll was transferred to the film by pushing the cast film toward the cooling roll using a silicone rubber roll of 80 degrees hardness as the pressure roll 9.

(b) A Film Composed of a PC Resin

As a PC resin, a resin of a trade name "CALIBRE 200-13" having Tg of 143 degrees C., an amorphous resin, manufactured by SUMITOMO DOW, Ltd., was used.

A forming material prepared in a shape of pellets was dried by keeping it in a hot-air drier having an exhaust outlet heated to 120 degrees C. After checking that the moisture content in the resin composition of the forming material was 200 ppm or less, a film with the surface roughness shown in TABLE 2 was processed using a manufacturing equipment of a film for film capacitors of FIG. 1 which is constructed of a 40 mm-dia single screw extruder of a trade name "MVS 40-25 L/D=25" manufactured by IKG Corporation, as the extruder 1, the T-die 7 and the cooling roll 10, at a cylinder temperature of 270-290 degrees C., a screw rotation number of 30 rpm, an adaptor temperature of 290 degrees C. and a T-die temperature of 290 degrees C. The melt extrusion of the forming material was cast onto the cooling roll being kept at a temperature shown in TABLE 2, and then the rough surface of the cooling roll was transferred to the film by pushing the cast film toward the cooling roll using a silicone rubber roll of 80 degrees hardness as the pressure roll 9.

(c) A Film Composed of a TPX Resin

As a TPX resin, a resin of a trade name "MX002" having a inciting point of 228 degrees C., a crystalline resin, manufactured by MITSUI CHEMICALS, was used.

A forming material prepared in shape of pellets was dried by keeping it in a hot-air drier having an exhaust outlet heated to 120 degrees C. After checking that the moisture content in the resin composition of the forming material was 300 ppm or less, a film with the surface roughness shown in TABLE 2 was processed using a manufacturing equipment of a film for film capacitors of FIG. 1 which is constructed of a 40 mm-dia single screw extruder of a trade name "MVS 40-25 L/D=25" manufactured by IKG Corporation, as the extruder 1, the T-die 7 and the cooling roll 10, at a cylinder temperature of 280-290 degrees C., a screw rotation number of 30 rpm, an adaptor temperature of 290 degrees C. and a T-die temperature of 290 degrees C. The melt extrusion of the forming material was cast onto the cooling roll being kept at a temperature shown in TABLE 2, and then the rough surface of the cooling roll was transferred to the film by pushing the cast film toward the cooling roll using a silicone rubber roll of 80 degrees hardness as the pressure roll 9.

Measurement and Evaluation

<Surface Roughness>

Arithmetic average roughness (Ra) and maximum height (Rz) were measured in accordance with the standard of JIS B 601-2001. Ten (10) points average roughness (Rz94) was measured in accordance with the standard of JIS B 601-1994.

<Thickness>

Using a electronic micrometer "Millitron 1240" manufactured by Mahr, a contact-type thickness indicator, measurements were taken at total 95 points, a product of 5 points along longitudinal direction of a film and 19 points along transverse direction of the film, and an average thickness was calculated.

<Dynamic Friction Coefficient>

A dynamic friction coefficient of a film for film capacitors was measured in accordance with a standard of JIS K 7125-1999. Using a universal material testing instrument "TENSILON" manufactured by A&D Company, Ltd., a film surface to film surface dynamic friction coefficient was measured at 23 degrees C., in 50% relative humidity and at a testing speed of 100 mm/min, applying 1.96N vertical load through a plane indenter.

<Dielectric Breakdown Voltage>

A dielectric breakdown voltage of a film for film capacitors was measured by a short time dielectric breakdown testing, at 23 degrees C., in air, in accordance with a standard of JIS C 2110-1994. A cylindrical electrode having an upper portion of 25 mm in diameter and 25 mm in height, and a lower portion of 25 mm in diameter and 15 mm in height was used.

FIG. 3 shows enlarged photographs of surfaces of EXAMPLE 4 film processed with the etching roll, REF 1 film processed with the mirror roll and REF 3 film processed with the blast roll, at a cooling roll temperature of 180 degrees C. each, taken by a CCD camera on both the cooling roll side and the pressure roll side of each film. The film for film capacitors of EXAMPLE 4 shows a uniformly aligned pattern of dents transferred from the bosses on the etching roll surface. On the other hand, the film of REF 3 shows a random distribution of bosses or dents in nonuniform sizes transferred from the blast roll surface. As shown in TABLE 2, a film having a high slidability and a high dielectric withstanding voltage can be obtained by form a rough surface on it, where small bosses or dents of small dimensional dispersion are uniformly distributed.

Referring to FIG. 2, the following results have been obtained.

(A) The films prepared using the etching rolls show the higher arithmetic average roughness (Ra) values, the higher slidability and the higher dielectric withstanding voltages, as compared to those for the film prepared using the mirror roll. Especially, the films by the etching rolls show the higher dielectric breakdown voltage minimum values.

(B) Among the films prepared using the blast rolls, the film by the blast roll having a surface of the large (Ra) value brought a film having the large (Ra) surface and the large CV (coefficient of variation) of the (Ra) average values. The film by the large (Ra) blast roll shows good slidability, but shows the poor dielectric withstanding voltage. Especially, the film by the large (Ra) blast roll shows the very low dielectric breakdown voltage minimum value.

(C) The films prepared using the etching rolls show the higher slidability, the higher dielectric withstanding voltages and the higher dielectric breakdown voltage minimum values, as compared to those for the films prepared using the blast rolls.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for manufacturing a film for film capacitors having a thickness of 10 microns or less, comprising the successive steps of:
    mixing and preparing a forming material composed of a thermoplastic resin composition;
    melting and extruding the forming material to a film through a T-die;
    pinching and cooling the film between a pressure roll and a cooling roll having a rough surface for forming a uniform rough surface on the film,
    wherein the rough surface of the cooling roll has (σ/Ra) of 0.2 or less, and the uniform rough surface of the film has (σ/Ra) of 0.2 or less, where (Ra) is an arithmetic average roughness defined by a method specified in JIS B 0601 2001, and (σ) is a standard deviation; and
    rolling up the cooled film onto a winding tube in a winding unit,
    wherein the film has surface properties of (Ra) of 0.2 microns or less, (Rz/Ra) of 10 or less and a dynamic friction coefficient of 1.5 or less, where (Rz) is a maximum height defined by the method specified in JIS B 0601 2001.

2. The method for manufacturing a film for film capacitors according to claim 1,
    wherein the cooling roll has the rough surface of (Ra) in a range of 0.5-2.0 microns.

3. The method for manufacturing a film for film capacitors according to claim 1,
    wherein the rough surface of the cooling roll is formed by uniformly disposing in lines a plurality of a uniform size boss portions or dent portions having a circular cross-section, the circular cross-section having a diameter in a range of 5-50 microns, the boss portions each or dent portions each having a chamfer in a range of 0-25 microns and a height or a depth of 1-25 microns, a uniform pitch between adjacent bosses or adjacent dents being in a range of 10-100 microns.

4. The method for manufacturing a film for film capacitors according to claim 1,
    wherein the rough surface of the cooling roll is formed by uniformly disposing in lines a plurality of a uniform size boss portions or dent portions having a polygonal cross-section, the polygonal cross-section having a circumscribed circle diameter in a range of 5-50 microns, the boss portions each or dent portions each having a chamfer in a range of 025 microns and a height or a depth of 125 microns, a uniform pitch between adjacent bosses or adjacent dents being in a range of 10100 microns.

5. The method for manufacturing a film for film capacitors according to claim 1,
    wherein a direction of each of the lines of the boss portions or dent portions being disposed on the rough surface of the cooling roll makes an angle in a range of 0-45 degrees to an axis direction of the cooling roll.

6. The method for manufacturing a film for film capacitors according to claim 5,
    wherein the rough surface of the cooling roll forms a zigzag alignment, the direction of each of the lines of the boss portions or dent portions being disposed on the rough surface of the cooling roll making an angle of 45 degrees to the axis direction of the cooling roll.

7. The method for manufacturing a film for film capacitors according to claim 1,
    wherein the rough surface of the cooling roll is formed by at least one method selected from a group consisting of an etching method, a machining method, an electro-discharge machining method, a carving method and a thermal spraying method.

8. The method for manufacturing a film for film capacitors according to claim 7,
wherein the rough surface of the cooling roll is formed by the etching method.

9. The method for manufacturing a film for film capacitors according to claim 1,
wherein a surface of the pressure roll is composed of a silicone rubber or a fluorine-containing rubber.

10. The method for manufacturing a film for film capacitors according to claim 1,
wherein the thermoplastic resin composition is composed of at least one resin selected from a group of crystalline thermoplastic resins consisting of a polyethylene resin (PE resin), a polypropylene resin (PP resin), a polyamide resin (PA resin), a polyacetal resin (POM resin), a polyethylene terephthalate resin (PET resin), an ultra high molecular weight polyethylene resin (UHPE resin), a polybutylene terephthalate resin (PBT resin), a polymethylpentene resin (TPX resin), a polyphenylene sulfide resin (PPS resin), a polyetheretherketone resin (PEEK resin), a liquid crystal polymer resin (LCP resin), a polytetrafluoroethylene resin (PTFE resin) and a syndiotacticpolystyrene resin (SPS resin).

11. The method for manufacturing a film for film capacitors according to claim 1,
wherein the thermoplastic resin composition is composed of at least one resin selected from a group of amorphous thermoplastic resins consisting of a polystyrene resin (PS resin), an acrylonitrile/styrene resin (AS resin), an acrylonitrile/butadiene/styrene resin (ABS resin), a methacryl resin (PMMA resin), a polyvinyl chloride resin (PVC resin), a polycarbonate resin (PC resin), a cycloolefin polymer resin (COP resin), a polyetherimide resin (PEI resin), a polyarylate resin (PAR resin), a polysulfone resin (PSF resin), a polyethersulfone resin (PES resin) and a polyamide-imide resin (PAI resin).

12. The method for manufacturing a film for film capacitors according to claim 1,
wherein the thermoplastic resin composition is composed of a polyetherimide resin (PEI resin)-based resin composition.

13. The method for manufacturing a film for film capacitors according to claim 12,
wherein the polyetherimide resin (PEI resin)-based resin composition comprises a polyetherimide resin (PEI resin) only resin composition or a resin composition composed of 100 parts by weight of the polyetherimide resin (PEI resin) and 1.0-30.0 parts by weight of a fluorine resin.

14. The method for manufacturing a film for film capacitors according to 12,
wherein the polyetherimide resin (PEI resin)-based resin composition comprises a polyetherimide resin (PEI resin) being alloyed or blended with at least one resin selected from a group consisting of a block copolymer, a random copolymer, and a modified copolymer of the polyetherimide resin (PEI resin), being copolymerized with other possible monomer.

15. The method for manufacturing a film for film capacitors according to claim 12,
wherein the polyetherimide resin (PEI resin) further includes at least one resin selected from a group consisting of:
(a) a thermoplastic polyimide series resin including a polyimide resin (PI resin), and a polyamide-imide resin (PAI resin);
(b) a polyarylene ketone series resin including a polyetherether ketone resin (PEEK resin), and a polyether ketone resin (PK resin);
(c) an aromatic polyethersulfone series resin including a polysulfone resin (PSU resin), a polyethersulfone resin (PES resin), and a polyphenylsulfone resin (PPSU resin);
(d) a polyarylenesulfide series resin including a polyphenylsulfide resin (PPS resin), a polyphenylsulfide sulfone resin, and a polyphenylsulfide ketone resin; and
(e) a liquid crystal polymer resin (LCP resin).

16. The method for manufacturing a film for film capacitors according to claim 13,
wherein the fluorine resin comprises at least one resin selected from a group including a polytetrafluoroethylene resin (PTFE resin), a tetrafluoroethylene-perfluoroalkylvinylether copolymer resin (PFA resin), a tetrafluoroethylene-hexafluoropropyl copolymer resin (FEP resin), a tetrafluoroethylene-ethylene copolymer resin (ETFE resin), a polyvinylidenefluoride resin (PVDF resin), and a polychlorotrifluoroethylene resin (PCTFE resin).

17. The method for manufacturing a film for film capacitors according to claim 1,
wherein the forming material composed of the thermoplastic resin composition has a moisture content of 5,000 ppm or less before melting and extruding.

* * * * *